(12) United States Patent
Stanhope (10) Patent No.: US 11,134,602 B2
(45) Date of Patent: Oct. 5, 2021

(54) SYSTEM AND METHOD FOR CONTROLLING THE SPEED OF AN AGRICULTURAL IMPLEMENT

(71) Applicant: CNH Industrial America LLC, New Holland, PA (US)

(72) Inventor: Trevor Stanhope, Rock Island, IL (US)

(73) Assignee: CNH Industrial America LLC, New Holland, PA (US)

( * ) Notice: Subject to any disclaimer, the term of this patent is extended or adjusted under 35 U.S.C. 154(b) by 189 days.

(21) Appl. No.: 16/027,514

(22) Filed: Jul. 5, 2018

(65) Prior Publication Data
US 2020/0008340 A1 Jan. 9, 2020

(51) Int. Cl.
*A01B 69/00* (2006.01)
*A01B 79/00* (2006.01)
*A01B 76/00* (2006.01)

(52) U.S. Cl.
CPC ............ *A01B 69/004* (2013.01); *A01B 76/00* (2013.01); *A01B 79/005* (2013.01)

(58) Field of Classification Search
CPC .............................. A01B 59/041; A01B 69/004
USPC ....................................................... 172/2, 3
See application file for complete search history.

(56) References Cited

U.S. PATENT DOCUMENTS

| | | | | |
|---|---|---|---|---|
| 7,904,226 B2 * | 3/2011 | Dix | ...................... | G01C 21/005 172/3 |
| 8,190,364 B2 * | 5/2012 | Rekow | ................... | A01B 69/006 701/302 |
| 8,275,516 B2 | 9/2012 | Murphy | | |
| 8,626,390 B2 | 1/2014 | Prickel et al. | | |
| 8,725,361 B2 | 5/2014 | Kellum | | |
| 8,768,558 B2 | 7/2014 | Reeve et al. | | |
| 9,002,565 B2 | 4/2015 | Jones et al. | | |
| 9,393,990 B2 | 7/2016 | Davis et al. | | |
| 9,952,596 B2 * | 4/2018 | Foster | .................... | A01B 69/00 |

(Continued)

FOREIGN PATENT DOCUMENTS

CN    101561680 A    10/2009

OTHER PUBLICATIONS

Stanhope, Applications of Low-Cost Computer Vision for Agricultural Implement Feedback and Control, McGill University, Montreal, Quebec, Canada, Apr. 15, 2016, 90 pages.

(Continued)

*Primary Examiner* — Gary S Hartmann
(74) *Attorney, Agent, or Firm* — Rebecca L. Henkel; Rickard K. DeMille (57) ABSTRACT

In one aspect, a system for controlling the speed of an agricultural implement may include a work vehicle including a vehicle-based controller, with the vehicle-based controller being configured to adjust a drive parameter of the work vehicle. The system may also include an agricultural implement configured to be towed by the work vehicle. The implement may include a sensor configured to detect an operational parameter indicative of an orientation of the implement relative to the work vehicle. The implement may further include an implement-based controller supported on the implement and being communicatively coupled to the sensor. The implement-based controller may be configured to initiate control of the drive parameter of the work vehicle based on sensor data received from the sensor in a manner that adjusts the speed of the implement.

15 Claims, 6 Drawing Sheets

(56) References Cited

U.S. PATENT DOCUMENTS

| | | | | |
|---|---|---|---|---|
| 10,114,378 B2* | 10/2018 | Korthals | ............... | A01B 69/004 |
| 10,194,574 B2* | 2/2019 | Knobloch | ............... | A01B 49/02 |
| 10,251,327 B2* | 4/2019 | Henry | .................... | A01B 63/22 |
| 10,605,356 B2* | 3/2020 | Kook | .................. | F16H 61/0213 |
| 10,611,407 B2* | 4/2020 | Lavoie | .................. | B62D 13/06 |
| 10,681,855 B2* | 6/2020 | Henry | .................... | A01B 63/22 |
| 2014/0172224 A1 | 6/2014 | Matthews et al. | | |
| 2014/0277961 A1 | 9/2014 | Blank et al. | | |
| 2015/0160655 A1 | 6/2015 | Korthals et al. | | |
| 2017/0006759 A1 | 1/2017 | Adamchuk et al. | | |
| 2017/0094894 A1 | 4/2017 | Heim et al. | | |
| 2017/0297621 A1 | 10/2017 | Bunderson et al. | | |
| 2018/0202804 A1* | 7/2018 | Dumble | ............... | A01B 69/003 |
| 2020/0113118 A1* | 4/2020 | Stanhope | ............. | A01B 79/005 |

OTHER PUBLICATIONS

Backman, Navigation System for Modular Agricultural Machines using Optimal Control Methods and Industrial Standard Network, Aalto University publication series Doctoral Dissertations, 169/2013, Finland, 2013, 129 Pages.

* cited by examiner

SYSTEM AND METHOD FOR CONTROLLING THE SPEED OF AN AGRICULTURAL IMPLEMENT

FIELD

The present disclosure generally relates to agricultural implements and, more particularly, to systems and methods for controlling the speed of an agricultural implement being towed by a work vehicle.

BACKGROUND

Agricultural implements, such as planters, cultivators, pull-type sprayers, nutrient applicators, and/or the like, are configured to be towed across a field by a suitable work vehicle, such as an agricultural tractor. While traversing the field, the implement is configured to perform one or more operations on the field, such as planting seeds, cultivating the soil, and/or applying pesticides, nutrients, and/or other agricultural substances. In many instances, to maintain the desired precision of the operation(s) being performed by the implement, it is necessary that the implement have a generally constant orientation or position relative to the work vehicle. However, the speed at which the implement is moved across the field may affect its orientation relative to the work vehicle.

Accordingly, improved systems and methods for controlling the speed of an agricultural implement would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for controlling the speed of an agricultural implement. The system may include a work vehicle including a vehicle-based controller, with the vehicle-based controller being configured to adjust a drive parameter of the work vehicle. The system may also include an agricultural implement configured to be towed by the work vehicle. The implement may include a sensor configured to detect an operational parameter indicative of an orientation of the implement relative to the work vehicle. The implement may further include an implement-based controller supported on the implement and being communicatively coupled to the sensor. The implement-based controller may be configured to initiate control of the drive parameter of the work vehicle based on sensor data received from the sensor in a manner that adjusts the speed of the implement.

In another aspect, the present subject matter is directed to a method for controlling the speed of an agricultural implement. The method may include monitoring, with an implement-based computing device installed on an agricultural implement, an operational parameter indicative of an orientation of the implement relative to an associated work vehicle as the implement is being towed across a field by the work vehicle. The method may also include comparing, with the implement-based computing device, the monitored operational parameter to at least one threshold parameter value. Furthermore, when the monitored operational parameter exceeds or falls below the least one threshold parameter value, the method may include initiating, with the implement-based computing device, control of a drive parameter of the work vehicle in a manner that adjusts the speed of the implement.

In a further aspect, the present subject matter is directed to a method for controlling the speed of an agricultural implement. The method may include monitoring, with an implement-based computing device installed on an agricultural implement, an operational parameter indicative of an orientation of the implement relative to an associated work vehicle as the implement is being towed across a field by the work vehicle. The method may also include classifying, with the implement-based computing device, the operational parameter as one of a first classification state or a second classification state over the time period. Furthermore, the method may include initiating, with the implement-based computing device, control of a drive parameter of the work vehicle in a manner that adjusts the speed of the implement based on the classification state of the operational parameter.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling the speed of an agricultural implement being towed by a work vehicle across a field. In several embodiments, the work vehicle may include a vehicle-based controller(s) configured to control a drive parameter(s) of the work vehicle, such as one or more parameters of an engine, a transmission, and/or a braking actuator(s) of the work vehicle. Furthermore, the implement may include a sensor(s) coupled thereto that is configured to detect an operational parameter indicative of the orientation of the implement relative to the work vehicle. In this regard, an implement-based controller(s) supported on the implement may be configured to initiate control of the drive parameter(s) of the work vehicle based on sensor data received from the sensor(s) in a manner that adjusts the speed of the implement. For instance, upon receipt of the data from the sensor(s), the implement-based controller(s) may be configured to transmit signals to the vehicle-based controller(s) (e.g., via ISOBUS Class 3 communications protocols (ISO 11783-9)) requesting the vehicle-based controller(s) to control the operation of the engine, the transmission, and/or braking actuator(s) in a manner that adjusts or varies the speed of the implement. As such, based on the request from the implement-based controller(s), the vehicle-based controller(s) may control the engine, the transmission, and/or braking actuator(s) such that the speed of the implement is adjusted or varied.

Figure 1:
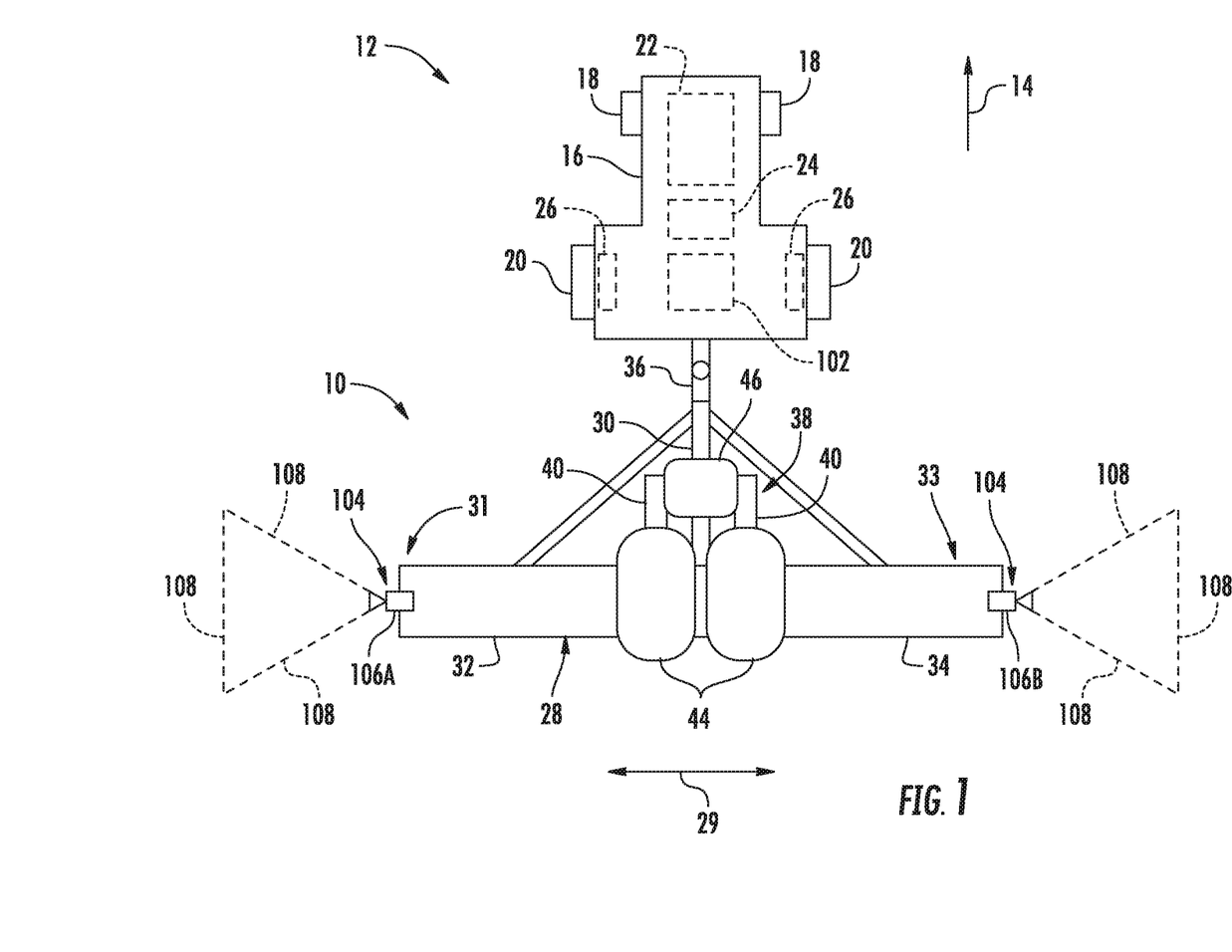
FIG. 1 illustrates a top view of one embodiment of an agricultural implement coupled to a work vehicle in accordance with aspects of the present subject matter.
Figure 2:
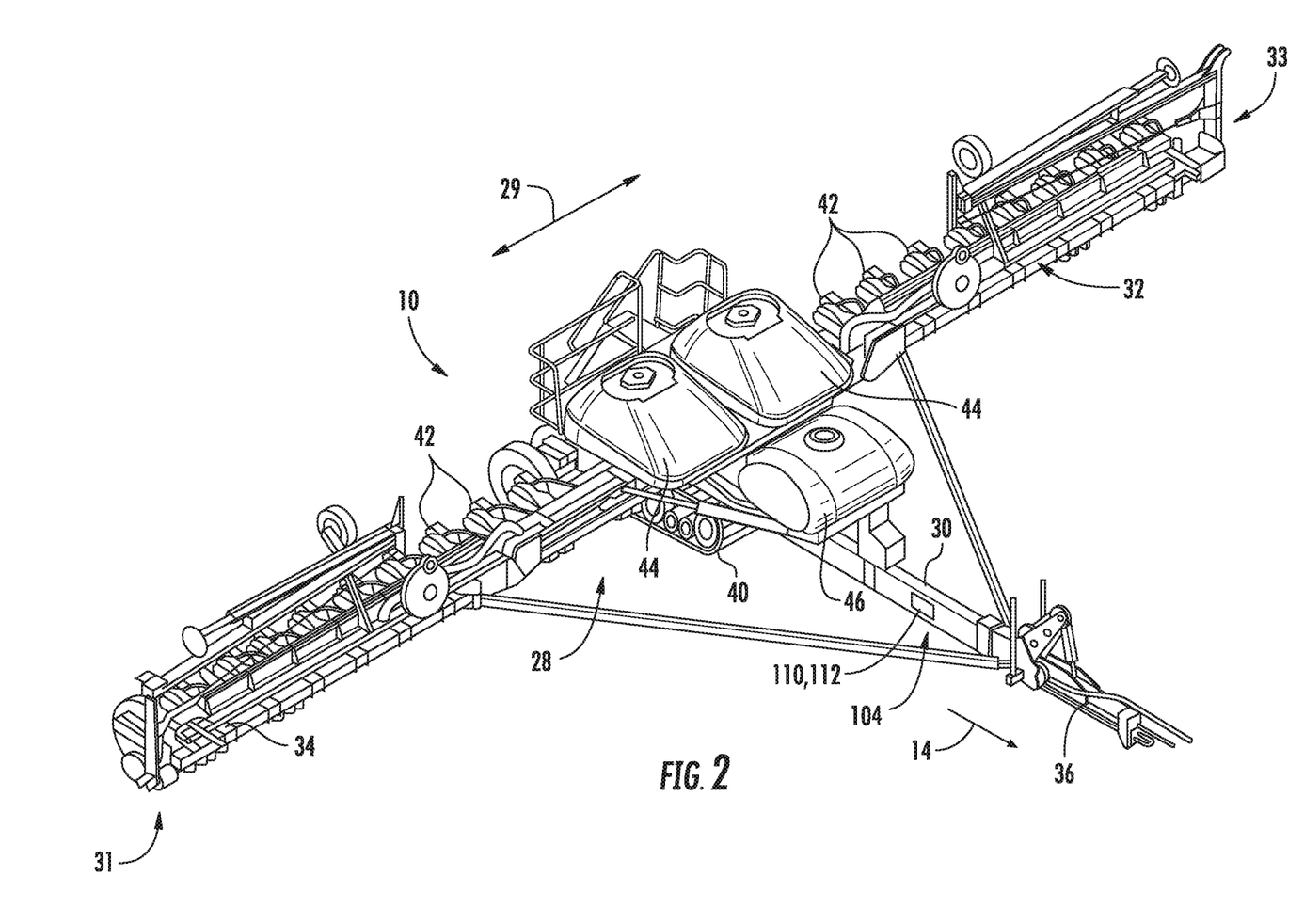
FIG. 2 illustrates a perspective view of the agricultural implement shown in FIG. 1, particularly illustrating various components of the implement.

Referring now to the drawings, FIGS. 1 and 2 illustrate differing views of one embodiment of an agricultural implement 10 in accordance with aspects of the present subject matter. Specifically, FIG. 1 illustrates a top view of the agricultural implement 10 coupled to a work vehicle 12. Additionally, FIG. 2 illustrates a perspective view of the implement 10, particularly illustrating various components of the implement 10.

In general, the work vehicle 12 may be configured to tow the implement 10 across a field in a direction of travel (e.g., as indicated by arrow 14 in FIG. 1). As shown, the work vehicle 12 may be configured as an agricultural tractor and the implement 10 may be configured as an associated planter. However, in other embodiments, the work vehicle 12 may be configured as any other suitable type of vehicle, such as an agricultural harvester, a self-propelled sprayer, and/or the like. Similarly, the implement 14 may be configured as any other suitable type of implement, such as a tillage implement.

As shown in FIG. 1, the work vehicle 12 may include a frame or chassis 16 configured to support or couple to a plurality of components. For example, a pair of steerable front wheels 18 and a pair of driven rear wheels 20 may be coupled to the frame 16. The wheels 18, 20 may be configured to support the work vehicle 12 relative to the ground and move the work vehicle 12 in the direction of travel 14 across the field. However, it should be appreciated that, in alternative embodiments, the front wheels 18 may be driven in addition to or in lieu of the rear wheels 20. Additionally, it should be appreciated that, in further embodiments, the work vehicle 12 may include track assemblies (not shown) in place of the front and/or rear wheels 18, 20.

Furthermore, the work vehicle 12 may include one or more devices for adjusting the speed at which the work vehicle 12 moves across the field in the direction of travel 14. Specifically, in several embodiments, the work vehicle 12 may include an engine 22 and a transmission 24 mounted on the frame 16. As is generally understood, the engine 22 may be configured to generate power by combusting or otherwise burning a mixture of air and fuel. The transmission 24 may, in turn, be operably coupled to the engine 22 and may provide variably adjusted gear ratios for transferring the power generated by the engine power to the driven wheels 20. For example, increasing the power output by the engine 22 (e.g., by increasing the fuel flow to the engine 22) and/or shifting the transmission 24 into a higher gear may increase the speed at which the work vehicle 12 moves across the field. Conversely, decreasing the power output by the engine 22 (e.g., by decreasing the fuel flow to the engine 22) and/or shifting the transmission 24 into a lower gear may decrease the speed at which the work vehicle 12 moves across the field. Additionally, the work vehicle 12 may include one or more braking actuators 26 that, when activated, reduce the speed at which the work vehicle 12 moves across the field, such as by converting energy associated with the movement of the work vehicle 12 into heat. For example, in one embodiment, the braking actuator(s) 26 may correspond to a suitable hydraulic cylinder(s) configured to push a stationary frictional element(s) (not shown), such as a brake shoe(s) or a brake caliper(s), against a rotating element(s) (not shown), such as a brake drum(s) or a brake disc(s). However, it should be appreciated that the braking actuator(s) 26 may any other suitable hydraulic, pneumatic, mechanical, and/or electrical component(s) configured to convert the rotation of the rotating element(s) into heat. Furthermore, although FIG. 1 illustrates one braking actuator 26 provided in operative association with each of the driven wheels 20, it should be appreciated that the work vehicle 12 may include any other suitable number of braking actuators 26. For example, in one embodiment, the work vehicle 12 may include one braking actuator 26 provided in operative association with each of the steerable wheels 18 in addition to or in lieu of the driven wheels 20.

Moreover, a location sensor 102 may be provided in operative association with the work vehicle 12. In this regard, the location sensor 102 may be configured to detect a parameter associated with a geographical or physical location of the work vehicle 12 within the field. For instance, in one embodiment, the location sensor 102 may correspond to a GNSS-based receiver configured to detect the GNSS coordinates of the work vehicle 12. However, it should be appreciated that, in alternative embodiments, the location sensor 102 may be configured as any suitable location sensing device for detecting the location of the work vehicle 12.

Referring to FIGS. 1 and 2, the implement 10 may include a frame 28 configured to support and/or couple to one or more components of the implement 10. Specifically, in several embodiments, the frame 28 may extend along a lateral direction 29 between a first side 31 of the implement 10 and a second side 33 of the implement 10. As shown, the frame 28 may include a center section 30 and a pair of wings sections 32, 34. In one embodiment, the wings sections 32, 34 may be pivotably coupled to the center section 30 in a manner that permits the wing sections 32, 34 to fold forward to reduce the lateral width of the implement 10, such as during storage or transportation of the implement 10 on a road. Furthermore, a tow bar 36 may be coupled to the center section 30 to allow the implement 10 to be towed by the work vehicle 12. Moreover, a track assembly 38 having a plurality of tracks 40 may be coupled to the center section 30 to support at least a portion of the frame 28 relative to the ground. However, it should be appreciated that, in alternative embodiments, the frame 28 may be supported relative to the ground by wheels (not shown) or any other suitable device. Additionally, as shown in FIG. 2, the wing sections 30, 32 may generally be configured to support a plurality of seed planting units (or row units) 42. As is generally understood, each row unit 42 may be configured to deposit seeds at a desired depth beneath the soil surface and at a desired seed spacing as the implement 10 is being towed by the work vehicle 12, thereby establishing rows of planted seeds. In some embodiments, the bulk of the seeds to be planted may be stored in one or more hoppers or seed tanks 44 mounted on or otherwise supported by the frame 28. Thus, as seeds are planted by the row units 42, a pneumatic distribution system (not shown) may distribute additional seeds from the seed tanks 44 to the individual row units 42. Additionally, one or more fluid tanks 46 mounted on or otherwise supported by the frame 28 may store agricultural fluids, such as insecticides, herbicides, fungicides, fertilizers, and/or the like, which may be sprayed onto the seeds during planting.

It should be appreciated that, for purposes of illustration, only a portion of the row units 42 of the implement 10 have been shown in FIG. 2. In general, the implement 10 may include any number of row units 42, such as six, eight, twelve, sixteen, twenty-four, thirty-two, or thirty-six row units. In addition, it should be appreciated that the lateral spacing between row units 42 may be selected based on the type of crop being planted. For example, the row units 42 may be spaced approximately thirty inches from one another for planting corn, and approximately fifteen inches from one another for planting soybeans.

In accordance with aspects of the present disclosure, the implement 10 may include one or more sensors 104 mounted thereon and configured to detect an operational parameter(s) indicative of the orientation of the implement 10 relative to the work vehicle 12. Specifically, as shown in FIG. 1, in several embodiments, the sensor(s) 104 may include one or more vision-based sensors 106 configured to detect seedbed ridges, furrows, and/or any other suitable geographical or crop feature feature(s) present within the field. In this regard, the vision-based sensor(s) 106 may be provided in operative association with the implement 10 such that the vision-based sensor(s) 106 has a field of view or sensor detection range (e.g., as indicated by dashed lines 108 in FIG. 1) directed towards a portion(s) of the field adjacent to the implement 10. For example, as shown in FIG. 1, in one embodiment, one vision-based sensor 106A may be provided at the first side 31 of the implement 10 to allow the vision-based sensor 106A to capture image data of a section of the field disposed adjacent to the first side 31 of the implement 10. Similarly, as shown in FIG. 1, a second vision-based sensor 106B may be provided at or adjacent to the second side 33 of the implement 10 to allow the vision-based sensor 106B to capture image data of a section of the field disposed adjacent to the second side 33 of the implement 10. In this regard, the vision-based sensors 106A, 106B may be configured to capture image data of the portion of the field across which the implement 10 will move on its next pass through the field. It should be appreciated that, in alternative embodiments, the vision-based sensors 106A, 106B may be installed at any other suitable location(s) on the implement 10. Furthermore, it should be appreciated that the implement 10 may include only one vision-based sensor 106 or more than two vision-based sensors 106.

Moreover, it should be appreciated that the vision-based sensor(s) 106 may correspond to any suitable sensing device(s) configured to detect or capture image data or other vision-based data (e.g., point cloud data) associated with the soil present within an associated field of view. For example, in several embodiments, the vision-based sensor(s) 106 may correspond to a suitable camera(s) configured to capture images of the field, such as three-dimensional images of the soil surface or the plants present with in the associated field of view. For instance, in a particular embodiment, the vision-based sensor(s) 106 may correspond to a stereographic camera(s) having two or more lenses with a separate image sensor for each lens to allow the camera(s) to capture stereographic or three-dimensional images. However, in alternative embodiments, the vision-based sensor(s) 106 may correspond to Light Detection and Ranging (LIDAR) sensor(s) or any other suitable vision-based sensing device(s). Additionally, in some embodiments, the sensor(s) 104 may include a Radio Detection and Ranging (RADAR) sensor(s), an ultrasonic sensor(s), or any other suitable non-contact beam-based sensor(s).

Furthermore, as shown in FIG. 2, the sensor(s) 104 may include a location sensor 110 configured to detect a parameter associated with a geographical or physical location of the implement 10 within the field. For instance, in one embodiment, the location sensor 110 may correspond to a GNSS-based receiver configured to detect the GNSS coordinates of the implement 10. However, it should be appreciated that, in alternative embodiments, the location sensor 110 may be configured as any suitable location sensing device for detecting the location of the implement 10.

Additionally, as shown in FIG. 2, the sensor(s) 104 may include one or more acceleration sensors 112 configured to detect a parameter(s) associated with movement or motion of the implement 10 relative to the work vehicle 12. For instance, in one embodiment, the acceleration sensor(s) 112 may correspond to a gyroscope(s) or an inertial motion unit(s) (IMU(s)). However, it should be appreciated that, in alternative embodiments, the acceleration sensor 112 may be configured as any suitable acceleration sensing device for detecting relative movement between the implement 10 and the work vehicle 12.

One of ordinary skill in the art would appreciate that, in alternative embodiments, the sensor(s) 104 may include any other suitable type of sensor(s) and such sensor(s) may be configured to detect any other suitable operational parameter(s) of the implement 10. For example, in one such alternative embodiment, the sensor(s) 104 may include a suitable contact-based sensor(s), such as a potentiometric sensor(s), a load sensor(s), a torque sensor(s), a strain gauge(s), and/or the like.

It should be appreciated that the configuration of the implement 10 and the work vehicle 12 described above and shown in FIGS. 1 and 2 is provided only to place the present subject matter in an exemplary field of use. Thus, it should be appreciated that the present subject matter may be readily adaptable to any manner of implement, work vehicle, and/or hitch assembly configurations.

Figure 3:
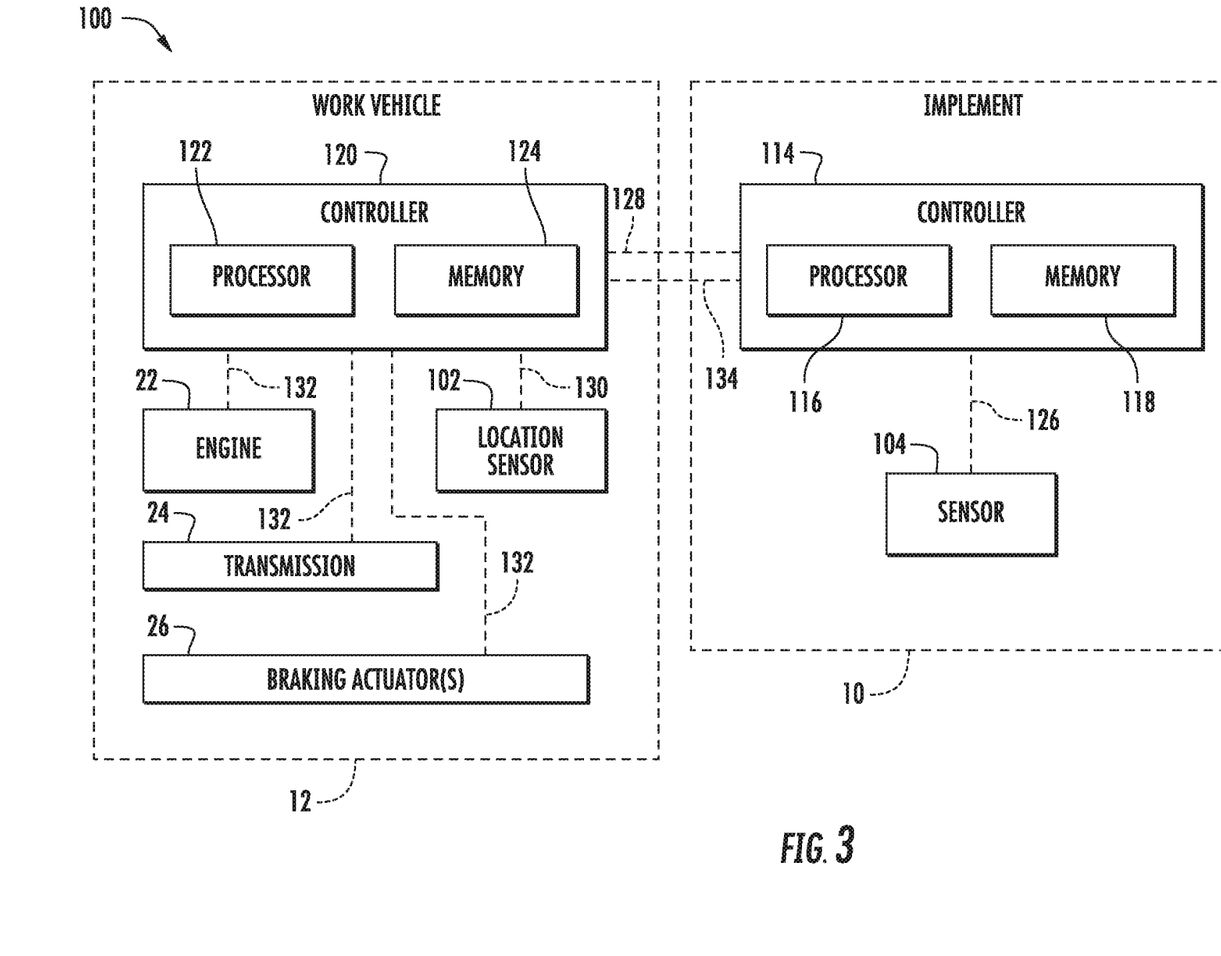
FIG. 3 illustrates a schematic view of one embodiment of a system for controlling the speed of an agricultural implement in accordance with aspects of the present subject matter.

Referring now to FIG. 3, a schematic view of one embodiment of a system 100 for controlling the speed of an agricultural implement being towed by a work vehicle is illustrated in accordance with aspects of the present subject matter. In general, the system 100 will be described herein with reference to the implement 10 and the work vehicle 12 described above with reference to FIGS. 1 and 2. However, it should be appreciated by those of ordinary skill in the art that the disclosed system 100 may generally be utilized with implements having any other suitable implement configuration and/or work vehicles having any other suitable vehicle configuration.

As shown in FIG. 3, the system 100 may include one or more implement-based controllers 114 positioned on and/or within or otherwise associated with the implement 10. In general, the implement controller(s) 114 may comprise any suitable processor-based device known in the art, such as a computing device or any suitable combination of computing devices. Thus, in several embodiments, the controller(s) 114 may include one or more processor(s) 116 and associated memory device(s) 118 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 118 of the controller(s) 114 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 118 may generally be configured to store suitable computer-readable instructions that, when implemented by the processor(s) 116, configure the implement controller(s) 114 to perform various computer-implemented functions, such as one or more aspects of the method 200 described below with reference to FIG. 6. In addition, the implement controller(s) 114 may also include various other suitable components, such as a communications circuit or module, one or more input/output channels, a data/control bus and/or the like.

It should be appreciated that the implement controller(s) 114 may correspond to an existing controller(s) of the implement 10, itself, or the controller(s) 114 may correspond to a separate processing device(s). For instance, in one embodiment, the implement controller(s) 114 may form all or part of a separate plug-in module that may be installed in association with the implement 10 to allow for the disclosed systems and methods to be implemented without requiring additional software to be uploaded onto existing control devices of the implement 10. It should also be appreciated that the functions of the implement controller(s) 114 may be performed by a single processor-based device or may be distributed across any number of processor-based devices, in which instance such devices may be considered to form part of the implement controller(s) 114.

Moreover, the system 100 may include one or more work vehicle-based controllers 120 positioned on and/or within or otherwise associated with the work vehicle 12. In general, the vehicle controller(s) 120 may comprise any suitable processor-based device known in the art, such as a computing device or any suitable combination of computing devices. Thus, in several embodiments, the controller(s) 120 may include one or more processor(s) 122 and associated memory device(s) 124 configured to perform a variety of computer-implemented functions. Such memory device(s) 124 may generally be configured to store suitable computer-readable instructions that, when implemented by the processor(s) 122, configure the vehicle controller(s) 120 to perform various computer-implemented functions, such as one or more aspects of the method 200 described below with reference to FIG. 6. In addition, the vehicle controller(s) 120 may also include various other suitable components, such as a communications circuit or module, one or more input/output channels, a data/control bus and/or the like.

It should be appreciated that the vehicle controller(s) 120 may correspond to an existing controller(s) of the work vehicle 12, itself, or the controller(s) 120 may correspond to a separate processing device. For instance, in one embodiment, the vehicle controller(s) 120 may form all or part of a separate plug-in module that may be installed in association with the work vehicle 12 to allow for the disclosed systems and methods to be implemented without requiring additional software to be uploaded onto existing control devices of the work vehicle 12. It should also be appreciated that the functions of the vehicle controller(s) 120 may be performed by a single processor-based device or may be distributed across any number of processor-based devices, in which instance such devices may be considered to form part of the vehicle controller(s) 120. For instance, the functions of the vehicle controller(s) 120 may be distributed across multiple application-specific controllers, such as an engine controller, a transmission controller, a brake system controller, a navigation controller, and/or the like.

In several embodiments, the implement controller(s) 114 may be configured to monitor an operational parameter indicative of the orientation of the implement 10 relative to the work vehicle 12 based on sensor data received from the sensor(s) 104. Specifically, the implement controller(s) 114 may be communicatively coupled to the sensor(s) 104 via a wired or wireless connection to allow sensor data (e.g., indicated by dashed lines 126 in FIG. 3) to be transmitted from the sensor(s) 104 to the controller(s) 114. The implement controller(s) 114 may then be configured determine or estimate the operational parameter based on the sensor data 126 received from the sensor(s) 104. For instance, the implement controller(s) 114 may include a look-up table, suitable mathematical formula, and/or algorithms stored within its memory 118 that correlates the sensor data 126 to the operational parameter. In several embodiments, such algorithms may include one or more suitable statistical classifiers, such as a convoluted neural network or fuzzy logic classifier.

Furthermore, in several embodiments, the implement controller(s) 114 may be configured to compare the monitored operational parameter to one or more desired operational parameter ranges. For instance, the implement controller(s) 114 may be configured to compare the values associated with the monitored parameter to a predetermined operational parameter range defined for the implement 10. Thereafter, in the event that the monitored operational parameter exceeds a maximum operational parameter threshold for the given operational parameter range or falls below a minimum operational parameter threshold for such range (thereby indicating that the operational parameter of the implement 10 may be too high or too low), the implement controller(s) 114 may be configured to initiate control of the drive parameter(s) of the work vehicle 12. As will be described below, the drive parameter(s) may be controlled in a manner that adjusts the speed of the implement 10.

Furthermore, in several embodiments, the implement controller(s) 114 may be configured to monitor the operational parameter over a time period and classify the monitored operational parameter as one of two or more classification states, such as a first classification state and a second classification state. For example, in one embodiment, when the monitored operational parameter is classified as the first classification state, the monitored operational parameter may indicate that the implement 10 or a portion thereof (e.g., one of the frame sections 30, 32, 34) is operating in a generally stable manner. Conversely, when the monitored operational parameter is classified as the second classification state, the monitored operational parameter may indicate that the implement 10 or a portion thereof (e.g., one of the frame sections 30, 32, 34) is operating in a generally unstable manner. It should be appreciated that, in one embodiment, the classification state of the operating parameter may generally be indicative of the stability of the implement 10 as a whole. In another embodiment, the classification state of the operating parameter may generally be indicative of the stability of only one or more components of the implement 10, such as one or more of the frame sections 30, 32, 34. Thereafter, the implement controller(s) 114 may be configured to initiate control of the drive parameter(s) of the work vehicle 12 based on the classification state of the monitored operational parameter. As will be described below, the drive parameter(s) may be controlled in a manner that adjusts the speed of the implement 10.

It should be appreciated that the time period may correspond to any suitable time period over which a sufficient number of samples of the operational parameter may be received to classify the operational parameter as one of the two or more classification states. For example, in one embodiment, the time period may correspond to at least one second, such as at least five seconds, at least ten seconds, at least fifteen seconds, or at least thirty seconds.

Figure 4:
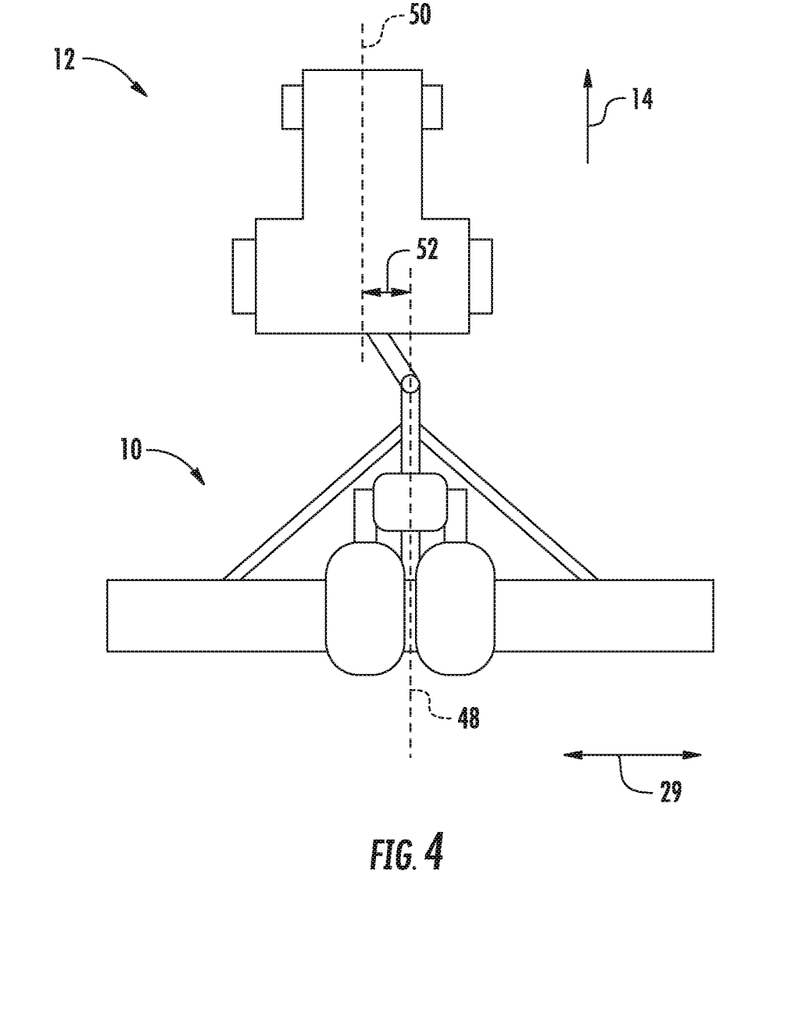
FIG. 4 illustrates a top view of the agricultural implement and the work vehicle shown in FIG. 1, particularly illustrating the longitudinal centerline of the implement laterally offset from the longitudinal centerline of the work vehicle in accordance with aspects of the present subject matter.

In one embodiment, the operational parameter monitored by the implement controller(s) 114 may be indicative of a lateral distance defined between the implement 10 and the work vehicle 12. More specifically, as shown in FIG. 4, the implement 10 may define a longitudinal centerline (e.g., as indicated by dashed line 48 in FIG. 4) extending generally perpendicular to the lateral direction 29. Similarly, the work vehicle 12 may define a longitudinal centerline (e.g., as indicated by dashed line 50 in FIG. 4) extending generally perpendicular to the lateral direction 29. In general, when the implement 10 is towed across the field by the work vehicle 12, it may be desirable that the longitudinal centerlines 48, 50 be collinear. However, as shown in FIG. 4, in certain instances, the position of the implement 10 may shift along the lateral direction 29 relative the work vehicle 12 such that, although the implement 10 and the work vehicle 12 are moving in the same direction of travel 14, a lateral distance (e.g., as indicated by arrow 52 in FIG. 4) is defined between the longitudinal centerlines 48, 50. In this regard, the implement controller(s) 114 may be configured to monitor the lateral distance 52 based on sensor data 126 received from the sensor(s) 104. Thereafter, in the event that the monitored lateral distance 52 exceeds a maximum lateral distance threshold for the implement 10 (thereby indicating that the lateral distance 52 defined between the longitudinal centerlines 48, 50 of the implement 10 and the work vehicle 12, respectively, may be too great), the implement controller(s) 114 may be configured to initiate control of the drive parameter(s) of the work vehicle 12 in a manner such that the speed of the implement 10 is reduced. Additionally, in one embodiment, the implement controller(s) 114 may be configured to initiate control of the drive parameter(s) of the work vehicle 12 in a manner such that the speed of the implement 10 is increased when the monitored lateral distance 52 falls below the maximum lateral distance threshold for the implement 10.

Figure 5:
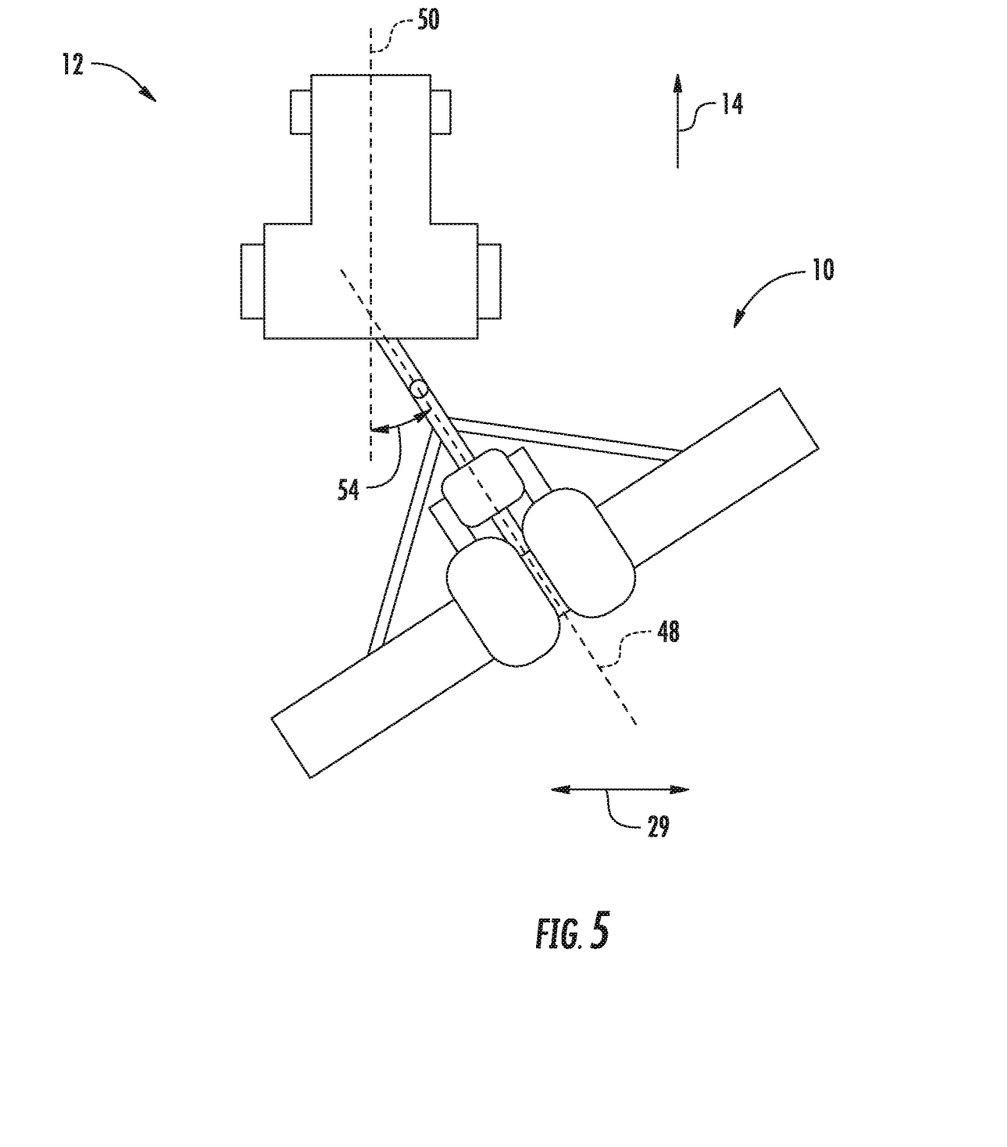
FIG. 5 illustrates a top view of the agricultural implement and the work vehicle shown in FIGS. 1 and 4, particularly illustrating the longitudinal centerline of the implement oriented at an angle relative to the longitudinal centerline of the work vehicle in accordance with aspects of the present subject matter.

In another embodiment, the operational parameter monitored by the implement controller(s) 114 may be indicative of the angle defined between the implement 10 and the work vehicle 12. As indicated above, when the implement 10 is towed across the field by the work vehicle 12, it may be desirable that the longitudinal centerlines 48, 50 of the implement 10 and the work vehicle 12, respectively, be collinear. However, as shown in FIG. 5, in certain instances, the position of the implement 10 may shift along the lateral direction 29 relative the work vehicle 12 such that an angle (e.g., as indicated by arrow 54 in FIG. 5) is defined between the longitudinal centerlines 48, 50. In this regard, the implement controller(s) 114 may be configured to monitor the angle 54 based on sensor data 126 received from the sensor(s) 104. Thereafter, in the event that the monitored angle 54 exceeds a maximum angle threshold for the implement 10 (thereby indicating that the angle 54 defined between the longitudinal centerlines 48, 50 of the implement 10 and the work vehicle 12, respectively, may be too great), the implement controller(s) 114 may be configured to initiate control of the drive parameter(s) of the work vehicle 12 in a manner such that the speed of the implement 10 is reduced. Furthermore, in one embodiment, the implement controller(s) 114 may be configured to initiate control of the drive parameter(s) of the work vehicle 12 in a manner such that the speed of the implement 10 is increased when the monitored angle 54 falls below the maximum angle threshold for the implement 10.

In a further embodiment, the operational parameter monitored by the implement controller(s) 114 may be indicative of the frequency or amplitude of movement between the implement 10 and the work vehicle 12 over a period of time. Specifically, as the work vehicle 12 tows the implement 10 across the field, the implement 10 may wobble relative to the vehicle 12 along the lateral direction 29 and/or pitch forward and aft. In this regard, the implement controller(s) 114 may be configured to monitor the movement of the implement 10 relative to the work vehicle 12 (e.g., the lateral distance 52 and/or the angle 54 based on sensor data 126 received from the sensor(s) 104) over the period of time. In this regard, the implement controller(s) 114 may be configured to classify such movement of the implement 10 relative to the vehicle 12 as being stable or unstable. Thereafter, the implement controller(s) 114 may be configured to initiate control of the drive parameter(s) of the work vehicle 12 in a manner such that the speed of the implement 10 is adjusted based on the classification state of the operating parameter. For example, in one embodiment, the implement controller(s) 114 may be configured to initiate control of the drive parameter(s) of the work vehicle 12 to increase or decrease the speed of the implement 10 when the movement of the implement 10 relative to the work vehicle 12 is classified as unstable to adjust the monitored operational parameter in a manner that stabilizes the operation of the implement 10 or a component thereof. Conversely, the implement controller(s) 114 may be configured to initiate control of the drive parameter(s) of the work vehicle 12 to increase the speed of the implement 10 when the movement of the implement 10 relative to the work vehicle 12 is classified as stable to increase efficiency of the implement 10.

It should be appreciated that the implement controller(s) 114 may be configured to determine the lateral distance 52 and/or the angle 54 based on any suitable sensor data 126 received from any suitable sensor of the sensor(s) 104. In several embodiments, the implement controller(s) 114 may determine the lateral distance 52 and/or the angle 54 based on captured images or other vision-based data received from the vision-based sensor(s) 106. For example, in one embodiment, the captured images may provide an indication of the position of the implement 10 relative to a feature(s) within the field (e.g., crop rows or seedbed ridges). If the position of the work vehicle 12 relative to this feature(s) is known or detected, the implement controller(s) 114 may determine the lateral distance 52 and/or the angle 54. In other embodiments, location data received from the location sensor 110, and/or acceleration data received from the acceleration sensor 112 may be configured to determine the lateral distance 52 and/or the angle 54.

Additionally, in several embodiments, the implement controller(s) 114 may be configured to initiate control of the drive parameter(s) of the work vehicle 12 when the implement 10 is positioned relative to a feature within the field. As indicated above, in one embodiment, the sensor(s) 104 may include the vision-based sensor(s) 106. In such embodiments, the implement controller(s) 114 may be configured to receive image data or other vision-based data from such vision-based sensor(s) 106. Thereafter, the implement controller(s) 114 may be configured to identify any topographical or geographical features (e.g., hills, ridges, depressions, and/or the like) within the received image data. In this regard, the implement controller(s) 114 may be configured to execute any suitable image processing algorithms stored within its memory 118 or otherwise use any suitable image processing techniques to identify the presence of topographical or geographical features within the received image data. In another embodiment, the controller 108 may include field data (e.g., a previously captured swath map of the field) stored within its memory 118. In such embodiment, the implement controller(s) 114 may be configured to compare the location of the implement 10 (e.g., as determined based on the location data received from the location sensor 110) to the stored field data to identify any topographical or geographical features within the field proximate to the implement 10. In the event that the implement 10 is positioned proximate to a topographical or geographical feature within the field that is likely to cause the lateral distance 52 to exceed the predetermined lateral distance threshold and/or cause the angle 54 to exceed the predetermined angle threshold, the implement controller(s) 114 may be configured to initiate control of the drive parameter(s) of the work vehicle 12 in a manner such that the speed of the implement 10 is reduced before the implement 10 encounters such feature. Moreover, in one embodiment, the implement controller(s) 114 may be configured to initiate control of the drive parameter(s) of the work vehicle 12 in a manner such that the speed of the implement 10 is increased when the implement 10 is positioned proximate to a topographical or geographical feature within the field that is unlikely to cause the lateral distance 52 to exceed the predetermined lateral distance threshold and/or cause the angle 54 to exceed a predetermined angle threshold. However, it should be appreciated that, in alternative embodiments, the implement controller(s) 114 may be configured to determine the proximity of the implement 10 to the topographical or geographical features within the field based on any other suitable input and/or data.

In several embodiments, the implement controller(s) 114 may be configured to request the vehicle controller(s) 120 to control the drive parameter(s) of the work vehicle 12. Specifically, as shown in FIG. 3, the implement controller(s) 114 may be communicatively coupled to the vehicle controller(s) 120 via a wired or wireless connection to allow request signals (e.g., indicated by dashed lines 128 in FIG. 3) to be transmitted from the implement controller(s) 114 to the vehicle controller(s) 120. For example, in one embodiment, the request signals 128 may be transmitted from the implement controller(s) 114 to the vehicle controller(s) 120 via ISOBUS Class 3 (ISO 11783-9) communications protocols. However, in alternative embodiments, the request signals 128 may be transmitted via suitable CAN bus communications protocols or any other suitable communications protocols. Upon receipt of the request signals 128, the vehicle controller(s) 120 may be configured to determine whether to control the drive parameter(s) in the manner requested by the implement controller(s) 114.

In one embodiment, the vehicle controller(s) 120 may be configured to determine when to control the drive parameter(s) in the manner requested by the implement controller(s) 114 based on the location of the vehicle 12 within the field. Specifically, the vehicle controller(s) 120 may be communicatively coupled to the location sensor 102, via wired or wireless connection, to allow location data (e.g., as indicated by dashed line 130 in FIG. 4) to be transmitted from the location sensor 102 to the vehicle controller(s) 120. As such, the vehicle controller(s) 120 may be configured to determine or estimate the current location of the vehicle 12 within the field based on the received location data 130. For example, the vehicle controller(s) 120 may be configured to compare this determined location to a map stored within its memory 124 to determine the location of the vehicle 12 within the field. Based on the location of the work vehicle 12 within the field, the vehicle controller(s) 120 may be configured to determine when the performance of field operations by the implement 10 has ceased, such as when the vehicle 12 is positioned proximate to and/or within a headlands or area of boundary or swath overlap. In such instances, the vehicle controller(s) 120 may be configured to ignore the request signals 128 received from the implement controller(s) 114. However, it should be appreciated that, in alternative embodiments, the vehicle controller(s) 120 may be configured to determine when to control the drive parameter(s) in the manner requested by the implement controller(s) 114 based on any other suitable parameter or combination of parameters.

As indicated above, the vehicle controller(s) 120 may be configured to control the operation of the drive parameters(s) to adjust the speed of the implement 10. Specifically, in several embodiments, the drive parameter(s) may correspond to a parameter of the engine 22, the transmission 24, and/or the braking actuator(s) 26. As shown in FIG. 3, in such embodiments, the vehicle controller(s) 120 may be communicatively coupled to the engine 22, the transmission 24, and/or the braking actuator(s) 26 to allow control signals (e.g., as indicated by dashed lines 132 in FIG. 3) to be transmitted from the vehicle controller(s) 120 to the engine 22, the transmission 24, and/or the braking actuator(s) 26. In this regard, the control signals 132 may be configured to instruct the engine 22 to vary its power output to increase or decrease the speed of the work vehicle 12. For example, when the monitored operational parameter falls outside of the predetermined range, the control signals 132 may instruct the engine 22 to decrease its power output (e.g., by decreasing the fuel flow to the engine 22) such that the speed at which the work vehicle 12 is moved across the field is decreased. Furthermore, the control signals 132 may be configured to instruct the transmission 24 to upshift or downshift to change the speed of the work vehicle 12. For example, when the monitored operational parameter falls outside of the predetermined range, the control signals 132 may instruct the transmission 24 to downshift such that the speed at which the work vehicle 12 is moved across the field is decreased. Additionally, the control signals 132 may be configured to instruct the braking actuator(s) 26 to activate in a manner such that the speed at which the work vehicle 12 is moved across the field is decreased. Such a reduction in vehicle speed may reduce or prevent the implement 10 from oscillating or moving laterally relative to the vehicle 12, thereby reducing or eliminating the lateral distance 52 and/or the angle 54 defined between the implement 10 and the work vehicle 12. However, it should be appreciated that, in alternative embodiments, the vehicle controller(s) 120 may be configured to transmit control signals 132 to any other suitable component(s) of the work vehicle 12 and/or implement 10 such that the speed of the work vehicle 12 and/or implement 10 is adjusted.

In several embodiments, the implement controller(s) 114 may be configured to control the drive parameter(s) based on data received from the vehicle controller(s) 120. As indicated above, in one embodiment, the vehicle controller(s) 120 may be configured to receive location data 130 from the location sensor 102 mounted on the vehicle 12. In such embodiment, the vehicle controller(s) 120 may, in turn, be configured to transmit data (e.g., as indicated by dashed line 134 in FIG. 3), such as data indicative of the location of the vehicle 12 within the field, to the implement controller(s) 114. Such data 134 may be raw data (e.g., raw GPS coordinates) or processed/preprocessed data (e.g., a cross-track error of the vehicle 12). As such, in embodiments in which the implement sensor(s) 104 include the location sensor 110, the implement controller(s) 114 may be configured to determine a parameter associated with the orientation of the implement 10 relative to the vehicle 12. For example, in one embodiment, such parameter may be a differential in the headings of the implement 10 and the vehicle 12. In another embodiment, such parameter may be a differential in the positioning of the implement 10 and the vehicle 12 relative to the crop rows or other features within the field. In a further embodiment, such parameter may be a differential in the cross-track errors of the implement 10 and the vehicle 12. Thereafter, in the event that the determined orientation parameter varies from a predetermined orientation (e.g., the heading differential falls outside of a predetermined range), the implement controller(s) 114 may be configured to request that the vehicle controller(s) 120 control the operation of the drive parameter(s) of the work vehicle 12 in a manner that adjusts the speed of the implement 10. However, it should be appreciated that, in alternative embodiments, the implement controller(s) 114 may be configured to initiate control of the drive parameter(s) based on any other suitable data and/or parameter received from the vehicle controller(s) 120.

Additionally, in one embodiment, the implement controller(s) 114 may be configured to initiate control of the drive parameter(s) based on a quality parameter associated with detected operational parameter. More specifically, in certain instances, the implement 10 may be moved across the field at a speed at which the sensor data 126 captured by the sensor(s) 104 may be of sufficiently low quality to be unsuitable for analysis. For example, the vision-based data captured the vision-based sensor(s) 106 may be blurry when the implement 10 is moved across the field at too high of a speed. As such, upon receipt of the sensor data 126, the implement controller(s) 114 may be configured to determine or estimate a quality parameter associated with such sensor data 126. In general, the quality parameter may be indicative of the overall suitability (e.g., the image clarity) of the captured sensor data 126. For instance, the implement controller(s) 114 may be configured to execute any suitable data processing algorithms (e.g., image processing algorithms) stored within its memory 118 or otherwise use any suitable data processing techniques (e.g., image processing techniques) to determine the quality parameter. Thereafter, in the event that the monitored quality parameter falls below a minimum quality parameter threshold (thereby indicating that the quality parameter associated with the captured sensor data 126 may be too low), the implement controller(s) 114 may be configured to initiate control of the drive parameter(s) of the work vehicle 12 in a manner that reduces the speed at which the implement 10 is moved across the field. It should be appreciated that reducing the speed of the implement 10 may improve the quality of the sensor data 126 captured by the sensor(s) 104, such as by reducing the blurriness of vision data captured by the vision-based sensor(s) 106.

Figure 6:
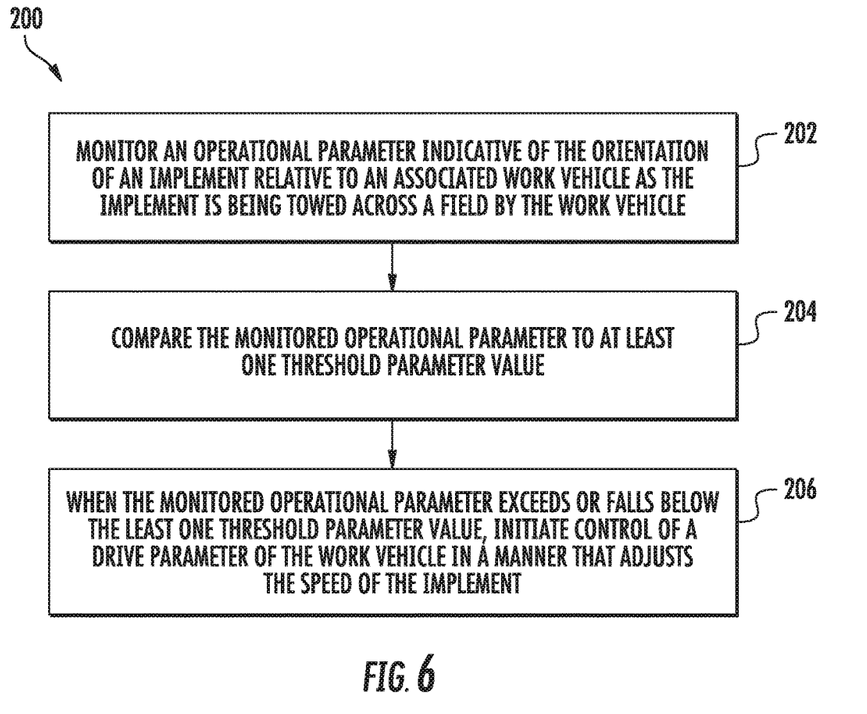
FIG. 6 illustrates a flow diagram of one embodiment of a method for controlling the speed of an agricultural implement in accordance with aspects of the present subject matter.

Referring now to FIG. 6, a flow diagram of one embodiment of a method 200 for controlling the speed of an agricultural implement being towed by a work vehicle is illustrated in accordance with aspects of the present subject matter. In general, the method 200 will be described herein with reference to the implement 10, the work vehicle 12, and the system 100 described above with reference to FIGS. 1-5. However, it should be appreciated by those of ordinary skill in the art that the disclosed method 200 may generally be utilized to control the operation of an agricultural implement being towed by a work vehicle for any agricultural implement having any suitable implement configuration, any work vehicle having any other suitable vehicle configuration, and/or any system having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include monitoring, with an implement-based computing device installed on the implement, an operational parameter indicative of an orientation of the implement relative to an associated work vehicle as the implement is being towed across a field by the work vehicle. For instance, as described above, one or more implement controllers 114 may be communicatively coupled to one or more sensors 104 configured to monitor a given operational parameter(s) of the implement 10 that is indicative of its orientation relative to the work vehicle 12, such as a lateral distance 52 or an angle 54 defined between the longitudinal centerlines 48, 50 of the implement 10 and the vehicle 12, respectively. As such, sensor data 126 transmitted from the sensor(s) 104 may be received by the implement controller(s) 114 for monitoring the associated operational parameter(s).

Additionally, at (204), the method 200 may include comparing, with the implement-based computing device, the monitored operational parameter to at least one threshold parameter value. For instance, as described above, the implement controller(s) 114 may be configured to compare the monitored operational parameter(s) to at least one threshold parameter value, such as a maximum parameter threshold and/or a minimum parameter threshold. Assuming the monitored operational parameter(s) has exceeded the maximum operational parameter threshold or fallen below the minimum operational parameter threshold, the implement controller(s) 114 may determine that the speed of the implement 10 should be adjusted.

Moreover, as shown in FIG. 6, at (206), the method 200 may include, when the monitored operational parameter exceeds or falls below the least one threshold parameter value, initiating, with the implement-based computing device, control of a drive parameter of the work vehicle in a manner that adjusts the speed of the implement. For instance, as described above, the implement controller(s) 114 may be configured to transmit request signals 128 to the vehicle controller(s) 120 requesting the vehicle controller(s) 120 to control the operation of the engine 22, the transmission 24, and/or the braking actuator(s) 26 of the work vehicle 12 to adjust the speed of the implement 10.

Figure 7:
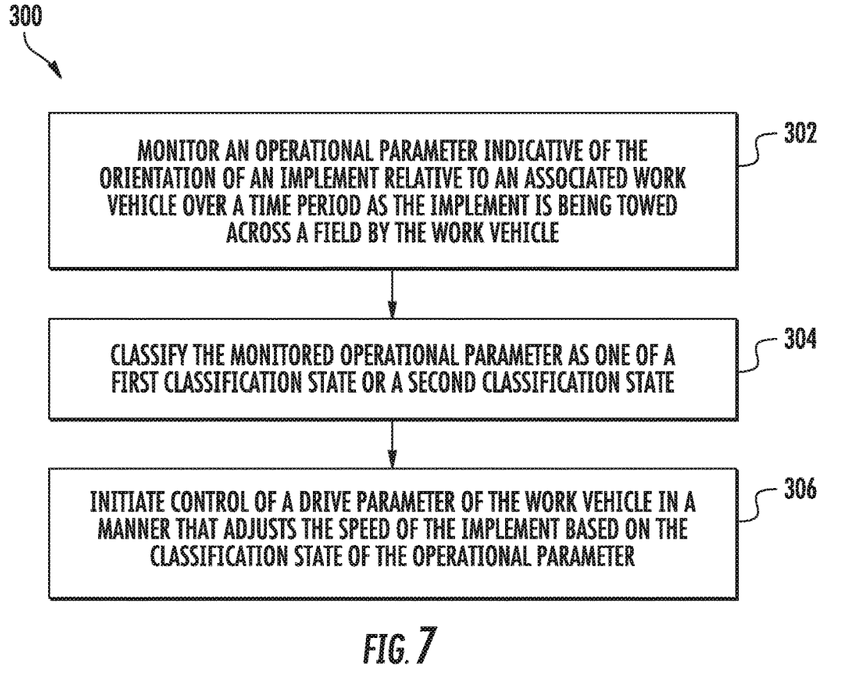
FIG. 7 illustrates a flow diagram of another embodiment of a method for controlling the speed of an agricultural implement in accordance with aspects of the present subject matter.

Referring now to FIG. 7, a flow diagram of another embodiment of a method 300 for controlling the speed of an agricultural implement being towed by a work vehicle is illustrated in accordance with aspects of the present subject matter. In general, the method 300 will be described herein with reference to the implement 10, the work vehicle 12, and the system 100 described above with reference to FIGS. 1-5. However, it should be appreciated by those of ordinary skill in the art that the disclosed method 300 may generally be utilized to control the operation of an agricultural implement being towed by a work vehicle for any agricultural implement having any suitable implement configuration, any work vehicle having any other suitable vehicle configuration, and/or any system having any other suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (302), the method 300 may include monitoring, with an implement-based computing device installed on an implement, an operational parameter indicative of the orientation of the implement relative to an associated work vehicle over a time period as the implement is being towed across a field by the work vehicle. For instance, as described above, one or more implement controllers 114 may be communicatively coupled to one or more sensors 104 configured to monitor a given operational parameter(s) of the implement 10 that is indicative of its orientation relative to the work vehicle 12, such as a lateral distance 52 or an angle 54 defined between the longitudinal centerlines 48, 50 of the implement 10 and the vehicle 12, respectively, over a time period. As such, sensor data 126 transmitted from the sensor(s) 104 may be received by the implement controller(s) 114 for monitoring the associated operational parameter(s) over the time period.

Additionally, at (304), the method 300 may include classifying, with the implement-based computing device, the monitored operational parameter as one of a first classification state or a second classification state. For instance, as described above, the implement controller(s) 114 may be configured to classify the monitored operational parameter as one of two or more classification states, such as a first classification state or a second classification state. Such classification states may generally be indicative of the stability of the implement 10 or one or more components thereof.

Moreover, as shown in FIG. 7, at (306), the method 300 may include initiating, with the implement-based computing device, control of a drive parameter of the work vehicle in a manner that adjusts the speed of the implement based on the classification state of the operational parameter. For instance, as described above, the implement controller(s) 114 may be configured to transmit request signals 128 to the vehicle controller(s) 120 requesting the vehicle controller(s) 120 to control the operation of the engine 22, the transmission 24, and/or the braking actuator(s) 26 of the work vehicle 12 to adjust the speed of the implement 10 based on the classification state of the monitored operational parameter.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for controlling the speed of an agricultural implement, the system comprising:
    a work vehicle including a vehicle-based controller, the vehicle-based controller being configured to adjust a drive parameter of the work vehicle; and
    an agricultural implement configured to be towed by the work vehicle, the implement including:
        a sensor configured to detect an operational parameter indicative of an orientation of the implement relative to the work vehicle; and
        an implement-based controller supported on the implement and being communicatively coupled to the sensor, the implement-based controller being configured to receive sensor data from the sensor and transmit signals to the vehicle-based controller requesting that the vehicle-based controller control the drive parameter in a manner that adjusts the speed of the implement based on the received sensor data,
    wherein the vehicle-based controller is further configured to determine when to control the drive parameter based on the signals received from the implement-based controller based on a location of the work vehicle within a field.

2. The system of claim 1, wherein the implement-based controller is further configured to monitor the detected operational parameter relative to a predetermined parameter range based on the received sensor data and transmit the signals to the vehicle-based controller requesting that the vehicle-based controller adjust the speed of the implement when the monitored operational parameter exceeds a predetermined maximum parameter value of the predetermined parameter range or falls below a predetermined minimum parameter value of the predetermined parameter range.

3. The system of claim 1, wherein the implement-based controller is further configured to:
    monitor the detected operational parameter over a time period;
    classify the operational parameter as one of a first classification state or a second classification state over the time period; and
    transmit the signals to the vehicle-based controller requesting that the vehicle-based controller adjust the drive parameter in a manner that adjusts the speed of the implement based on the classification state of the monitored operational parameter.

4. The system of claim 1, wherein the operational parameter is indicative of a lateral distance defined between a longitudinal centerline of the work vehicle and a longitudinal centerline of the implement.

5. The system of claim 1, wherein the implement-based controller is configured to transmit the signals to the vehicle-based controller requesting that the vehicle-based controller adjust the drive parameter of the work vehicle to adjust the speed of the implement when the implement is positioned relative to a feature within the field.

6. The system of claim 5, wherein the implement-based controller is further configured to determine the location of the feature within the field based on stored field data.

7. The system of claim 1, wherein the implement-based controller is configured to transmit the signals to the vehicle-based controller requesting that the vehicle-based controller adjust the drive parameter of the work vehicle to reduce the speed of the implement when it is determined that a quality parameter associated with the detected operational parameter has fallen below a predetermined quality parameter threshold.

8. The system of claim 1, wherein the vehicle-based controller is configured to determine when to adjust the drive parameter as requested by the implement-based controller based on a location of the work vehicle within a field.

9. The system of claim 1, wherein the vehicle-based controller is further configured to:
   determine when a field operation is being performed based on a location of the vehicle within the field as the vehicle travels across the field;
   control the drive parameter to adjust the speed of the implement based on the signals received from the implement-based controller when it is determined that the field operation is being performed as the vehicle travels across the field; and
   ignore the signals received from the implement-based controller when it is determined that performance of the field operation has ceased as the vehicle travels across the field.

10. A method for controlling the speed of an agricultural implement, the method comprising:
    monitoring, with an implement-based computing device installed on the agricultural implement, an operational parameter indicative of an orientation of the implement relative to an associated work vehicle as the implement is being towed across a field by the work vehicle;
    comparing, with the implement-based computing device, the monitored operational parameter to at least one threshold parameter value; and
    when the monitored operational parameter exceeds or falls below the least one threshold parameter value, transmitting, with the implement-based computing device, signals to a vehicle-based controller installed on the associated work vehicle requesting that the vehicle-based controller control a drive parameter of the work vehicle in a manner that adjusts the speed of the implement, the vehicle-based controller being configured to determine when to control the drive parameter based on the signals received from the implement-based controller based on a location of the work vehicle within the field.

11. The method of claim 10, wherein the operational parameter is indicative of a lateral distance defined between a longitudinal centerline of the work vehicle and a longitudinal centerline of the implement.

12. The method of claim 11, further comprising:
    transmitting, with the implement-based computing device, the signals to the vehicle-based controller requesting that the vehicle-based controller control the drive parameter of the work vehicle to reduce the speed of the implement when it is determined that the monitored lateral distance has exceeded a predetermined lateral distance threshold.

13. The method of claim 11, further comprising:
    transmitting, with the implement-based computing device, the signals to the vehicle-based controller requesting that the vehicle-based controller control the drive parameter of the work vehicle to increase the speed of the implement when it is determined that the monitored lateral distance has fallen below a predetermined lateral distance threshold.

14. The method of claim 10, further comprising:
    transmitting, with the implement-based computing device, the signals to the vehicle-based controller requesting that the vehicle-based controller control the drive parameter of the work vehicle to adjust the speed of the implement when the implement is positioned relative to a feature within the field.

15. The method of claim 10, further comprising:
    transmitting, with the implement-based computing device, the signals to the vehicle-based controller requesting that the vehicle-based controller control the drive parameter of the work vehicle to reduce the speed of the implement when it is determined that a quality parameter associated with the detected operational parameter has fallen below a predetermined quality parameter threshold.

* * * * *